US009067091B2

(12) United States Patent
Caliendo et al.

(10) Patent No.: US 9,067,091 B2
(45) Date of Patent: Jun. 30, 2015

(54) DAMPER ACTUATOR ASSEMBLY WITH SPEED CONTROL

(75) Inventors: Guy Caliendo, Algonquin, IL (US); Dean Anderson, Wonder Lake, IL (US); Pankaj Kalore, Buffalo Grove, IL (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 1937 days.

(21) Appl. No.: 11/603,459

(22) Filed: Nov. 22, 2006

(65) Prior Publication Data

US 2008/0051024 A1 Feb. 28, 2008

Related U.S. Application Data

(60) Provisional application No. 60/840,115, filed on Aug. 25, 2006.

(51) Int. Cl.

| | |
|---|---|
| ***G01B 7/14*** | (2006.01) |
| ***A62C 2/14*** | (2006.01) |
| ***A62C 2/24*** | (2006.01) |

(52) U.S. Cl.
CPC .. *A62C 2/14* (2013.01); *A62C 2/247* (2013.01)

(58) Field of Classification Search
USPC .................................... 454/256, 187; 600/21
See application file for complete search history.

(56) References Cited

U.S. PATENT DOCUMENTS

| | | | | |
|---|---|---|---|---|
| 5,346,362 | A * | 9/1994 | Bonner et al. | 415/191 |
| 5,481,188 | A * | 1/1996 | Mizutani | 324/207.25 |
| 6,100,655 | A * | 8/2000 | McIntosh | 318/159 |
| 6,519,549 | B1 * | 2/2003 | Lin et al. | 702/151 |
| 2004/0212336 | A1 * | 10/2004 | McMillan et al. | 318/439 |
| 2005/0224591 | A1 * | 10/2005 | Wolfson | 236/49.3 |

* cited by examiner

*Primary Examiner* — Steven B McAllister
*Assistant Examiner* — Samantha Miller

(57) ABSTRACT

A damper actuator assembly comprises a gear train including a follower gear. The follower gear is arranged such that the position of the follower gear indicates the position of at least one blocking member of a damper that the actuator is connected to. A sensor is positioned within the damper actuator and is configured to monitor the position of the follower gear. Accordingly, the sensor is configured to provide an electrical signal indicative of the position of the follower gear to a processor. A driving member is connected to the gear train and is configured to drive the gear train at two or more variable speeds depending on the electrical signal provided to the processor from the sensor.

17 Claims, 6 Drawing Sheets

DAMPER ACTUATOR ASSEMBLY WITH SPEED CONTROL

BACKGROUND

This invention relates to the field of building control systems, and more particularly, to ventilation and life safety dampers for use in building control systems.

Building control systems control various aspects of a building and include features directed to comfort, safety, lighting and other aspects. With respect to comfort, one aspect of a building control system includes heating, ventilation and air conditioning (HVAC). An HVAC system involves conditioning of the air within an area, zone or room (collectively, a "room"). Such conditioning includes providing heated air, cooled air, fresh air, circulated air and/or the like to the particular room depending on various factors. The HVAC system includes a system of ducts that terminate in particular rooms. The termination points are controlled by ventilation dampers or damper systems. Each ventilation damper/damper system is operative to open and close to control the flow of air through the respective termination point and into a room. Accordingly, ventilation dampers/damper systems (collectively, "dampers") are used for temperature control, pressure regulation, air circulation and/or replacement of stale air within the rooms of a building.

Basic two-position dampers are positionable into either a fully opened or a fully closed position. This two-position system provides for either full air flow or no air flow into a room. Modulated dampers are also available. Modulated dampers are positionable in many intermediate positions between open and closed. These intermediate positions can be advantageous when attempting to maintain the temperature in a room at a constant desired comfort level.

Many HVAC systems use only two-position dampers and do not incorporate modulated dampers. Other HVAC systems are designed with a combination of two-position dampers and modulated dampers. In these combination systems, the modulated damper is used for comfort control such as regulating the temperature in the associated room. In both systems, the two-position damper may be used as a safety feature in the event of fire and smoke. In particular, in certain situations it may be advantageous to vent heat and smoke away from a room. In other situations, it may be advantageous to seal a room to avoid fanning existing flames. Fire safety codes typically do not allow for modulated operation in the presence of smoke or fire in order to ensure basic operation of the damper. Thus, even if buildings include modulated dampers, they must also include two position fire and smoke safety dampers.

The two-position fire and smoke control damper generally employs a two-state actuator operable to open or close the damper. The two-position damper actuator generally includes power supply circuitry, motor control circuitry, an electric motor, and an actuator/damper interface. The power supply circuitry receives AC or DC input, transforms the input, if appropriate, and delivers power to the motor control circuitry. The motor control circuitry generally passes the appropriate power on to the electric motor, causing an interface adaptor from the actuator to deliver an appropriate torque to the actuator/damper interface. The actuator/damper interface is simply a gear arrangement or other mechanism or component used to join the output shaft of the actuator to the damper operator mechanism which is operable to open or close louvers of the damper. Accordingly, the actuator is positioned on or near the damper to allow the actuator/damper interface to connect to the damper operator mechanism.

One challenge in the manufacture of damper actuators is meeting certain UL and local code requirements. An example of such a requirement is that an actuator must open or close damper louvers, shifting the louvers from 0 to 90°, within a certain time period, such as fifteen seconds. However, when the actuator motor experiences a heavy load, the motor may not rotate as fast as expected, and it may take longer than expected to open or close the damper louvers. For example, if an actuator is controlling a damper upstream of a large fan, the required torque load increases due to air flow on the damper blades. In this situation, more power must be provided to the electric motor in order to rotate the electric motor at the speed required to open the damper louvers within the allotted time. Accordingly, it would be desirable to provide an actuator having the ability to increase the power to the actuator motor when the actuator motor is experiencing a heavy load.

In the above-described situation, it is advantageous to increase power to the actuator motor. However, in other situations, it would be advantageous to decrease power to the actuator motor. For example, when an actuator motor is driven too fast, unnecessary wear may result on the gear train of the actuator. Furthermore, when an actuator is driven all the way to its physical stop position at a high speed, the gears of the actuator slam to a stop as the actuator motor drives the gears with excessive force against the physical stop. Accordingly, it would be advantageous to decrease the power to the actuator motor when the gear train is moving at an excessive speed or when the gear train approaches the physical stop point. As a result of reduced speed in certain situations, less wear on the gears would result.

SUMMARY

A damper actuator assembly comprises a gear train including a follower gear. The follower gear is arranged such that the position of the follower gear indicates the position of at least one blocking member of a damper that the actuator is connected to. A sensor is positioned within the damper actuator and is configured to monitor the position of the follower gear. Accordingly, the sensor is configured to provide an electrical signal indicative of the position of the follower gear to a processor. A driving member is connected to the gear train and is configured to drive the gear train at variable speeds depending on the electrical signal provided to the processor.

The processor may be located within a housing of the damper actuator or may be located outside of the housing. Using the positional information from the sensor, the processor determines the speed of the follower gear and its present angular position. The processor then determines a desired speed at which the follower gear should be rotating based on its present position and sends a power control signal to the motor, either increasing or decreasing power to the motor such that the follower gear will rotate at the desired speed. The desired speed of the follower gear is a function of its angular position and the desired timing for opening the at least one blocking member of the damper. For example, the motor may be instructed to rotate faster if the information received from the follower gear indicates that at least one blocking member of the damper will not be fully opened or closed within a predetermined time. As another example, the motor may be instructed to rotate slower when the follower gear reaches a certain angular position indicating that the damper is substantially opened or closed. Control of the actuator in this manner advantageously allows the actuator to achieve desired operational parameters while reducing wear on the gear train and thus extending the life of the actuator.

The above described features and advantages, as well as others, will become more readily apparent to those of ordinary skill in the art by reference to the following detailed description and accompanying drawings.

DESCRIPTION

Figure 1:
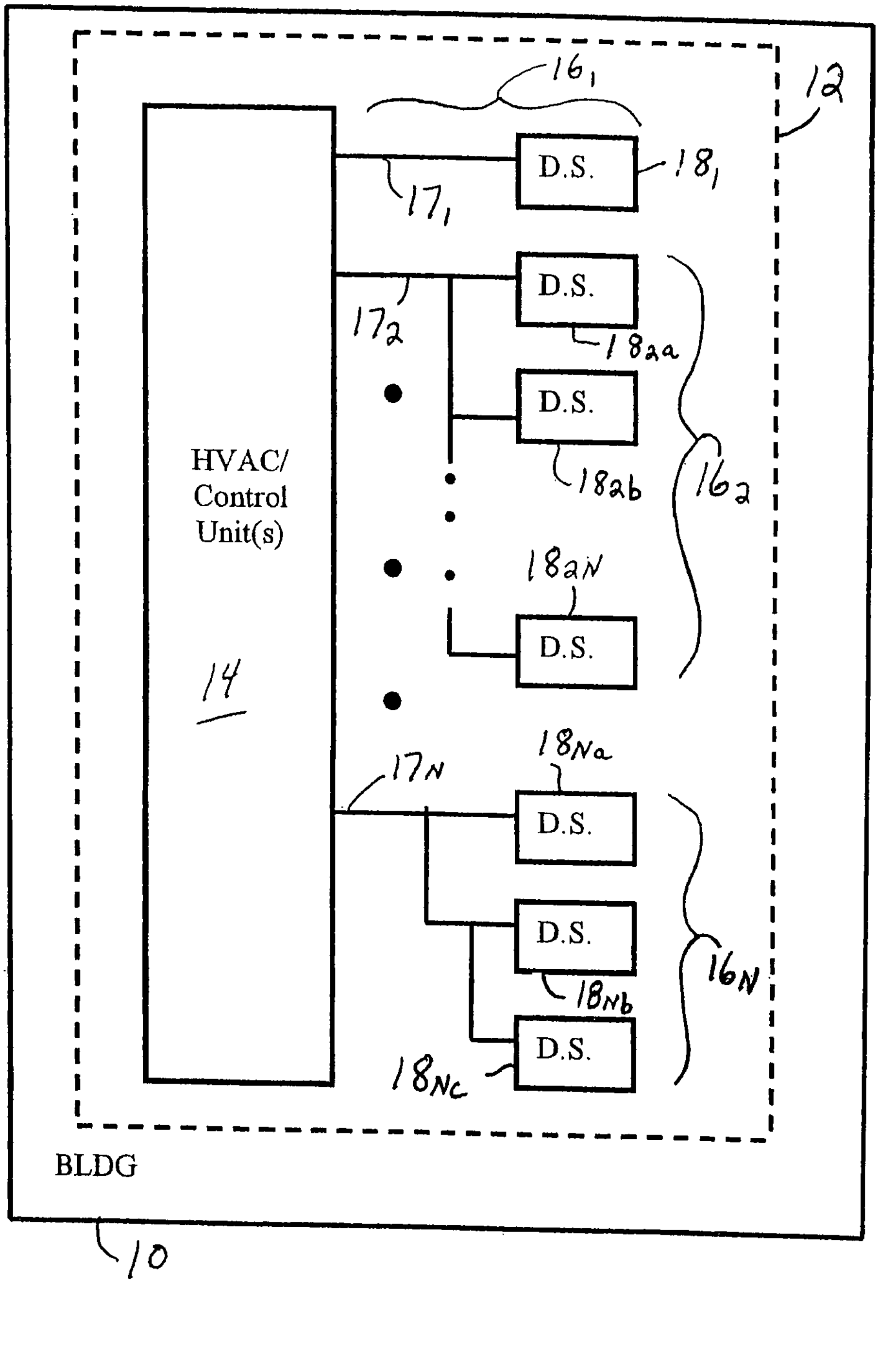
FIG. 1 shows a block diagram representation of a typical building having an HVAC/control system including a ventilation damper system.

With reference now to FIG. 1, there is depicted a representation of a building generally designated 10 in which the actuator damper assembly described herein may be used. It should be appreciated that the building 10 is representative of any structure that has a ventilation system or systems such as a house, multi-story building or the like. The building 10 has a ventilation/ventilation control system such as an HVAC/control system 12 having various HVAC and control components. The HVAC/control system 12 includes an HVAC/control unit(s) 14 representative of heating, air conditioning, and/or other ventilation sources, components, systems, equipment and/or the like as are well known in the art.

As is typical, the HVAC/control system 12 includes a plurality of air flow/control systems generally designated $\mathbf{16}_1$, $\mathbf{16}_2$ through $\mathbf{16}_N$ that direct the flow of air from the HVAC units to various places in the building 10 and which thereafter control the flow of air into the various places. Such places may be rooms, zones, areas or the like. Each air flow/control system $\mathbf{16}_1$, $\mathbf{16}_2$ through $\mathbf{16}_N$ is characterized by a series of air ducts or ductwork and communication/control lines both of which are concurrently represented by lines $\mathbf{17}_1$, $\mathbf{17}_2$ through $\mathbf{17}_N$. Each line $\mathbf{17}_1$, $\mathbf{17}_2$ through $\mathbf{17}_N$ terminates in at least one damper system 18 (also labeled as "D.S." in FIG. 1). Each damper system 18 provides adjustable control of air flow from the lines $\mathbf{17}_1$, $\mathbf{17}_2$ through $\mathbf{17}_N$ into the particular rooms of the building 10, particularly under control of the control system(s).

The air ducts or ductwork provide passageways for directing air flow from the HVAC units(s) 14 to various rooms of the building 10. Shown in FIG. 1 for illustrative purposes, are various exemplary manners in which the ducts may be configured and/or terminated. Particularly, the system $\mathbf{16}_1$ has a single duct $\mathbf{17}_1$ that terminates in a single damper system 181. The system $\mathbf{16}_2$ has a duct system $\mathbf{17}_2$ that has various branches from a main duct thereof, each of which terminates in a damper system $\mathbf{18}_{2a}$, $\mathbf{18}_{2b}$ through $\mathbf{18}_{2N}$. The system $\mathbf{16}_N$ has a variable branch duct system that terminates in damper systems $\mathbf{18}_{Na}$, $\mathbf{18}_{Nb}$ and $\mathbf{18}_{Nc}$.

Figure 2:
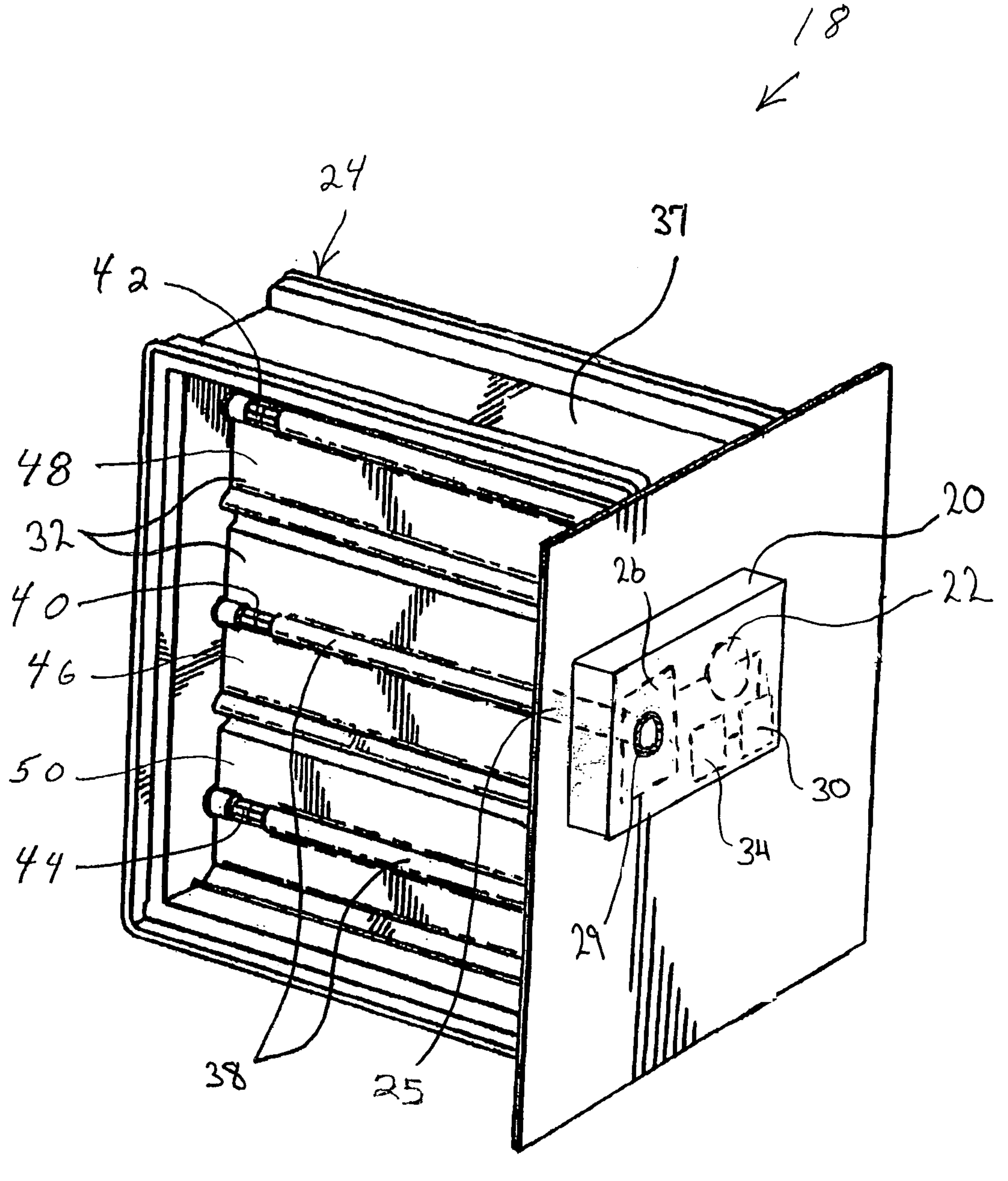
FIG. 2 shows a perspective view of an exemplary damper system of FIG. 1.

Referring now to FIG. 2, there is depicted an exemplary damper system 18 having an exemplary damper 24 to which is attached a damper actuator 20. The damper 24 includes a frame 37 and a plurality of adjustable blocking members such as vanes, blades, fins, louvers or the like 32. In FIG. 2, the blocking members are referred to as "louvers" 32. Each louver 32 is connected to a rotatable shaft 38. The damper 24 also includes a louver control 25. In FIG. 2 the exemplary louver control 25 is a control shaft 40. The control shaft 40 is mechanically coupled to an upper shaft 42 and a lower shaft 44 such that rotation of the control shaft 40 also rotates the upper shaft 42 and the lower shaft 44.

Each shaft 38 is coupled to one of the louvers 32 such that rotational movement of the shaft 38 rotates the associated louver 32. Because the control shaft 40 is mechanically coupled to both the upper shaft 42 and the lower shaft 44, rotation of the control shaft 40 results in rotation of louver 46 as well as louvers 48 and 50. As the louvers 32 rotate, they either open the damper 24 to allow air to flow of therethrough or close the damper to block the flow of air therethrough. In some situations, the louvers 46, 48, 50 may also be oriented in positions intermediate the fully open and fully closed positions thus only partially restricting the flow of air through the damper.

It should be appreciated that the damper 24 in FIG. 2 is depicted in the fully closed position. In this position, the louvers 46, 48 and 50 are perpendicular to the flow of air through the damper 24 and thus the louvers prevent the flow of air past the damper. A fully open position has the louvers 46, 48 and 50 parallel to the flow of air through the damper 24. The intermediate positions have the louvers 46, 48 and 50 at a rotational angle between perpendicular and parallel. It should be appreciated that the damper 24 is only exemplary of a style or type of damper and that other styles, configurations and/or types of dampers may be utilized. The damper 24 of FIG. 2, however, provides an illustration of the manner in which the dampers control the flow of air therethrough.

Figure 3:
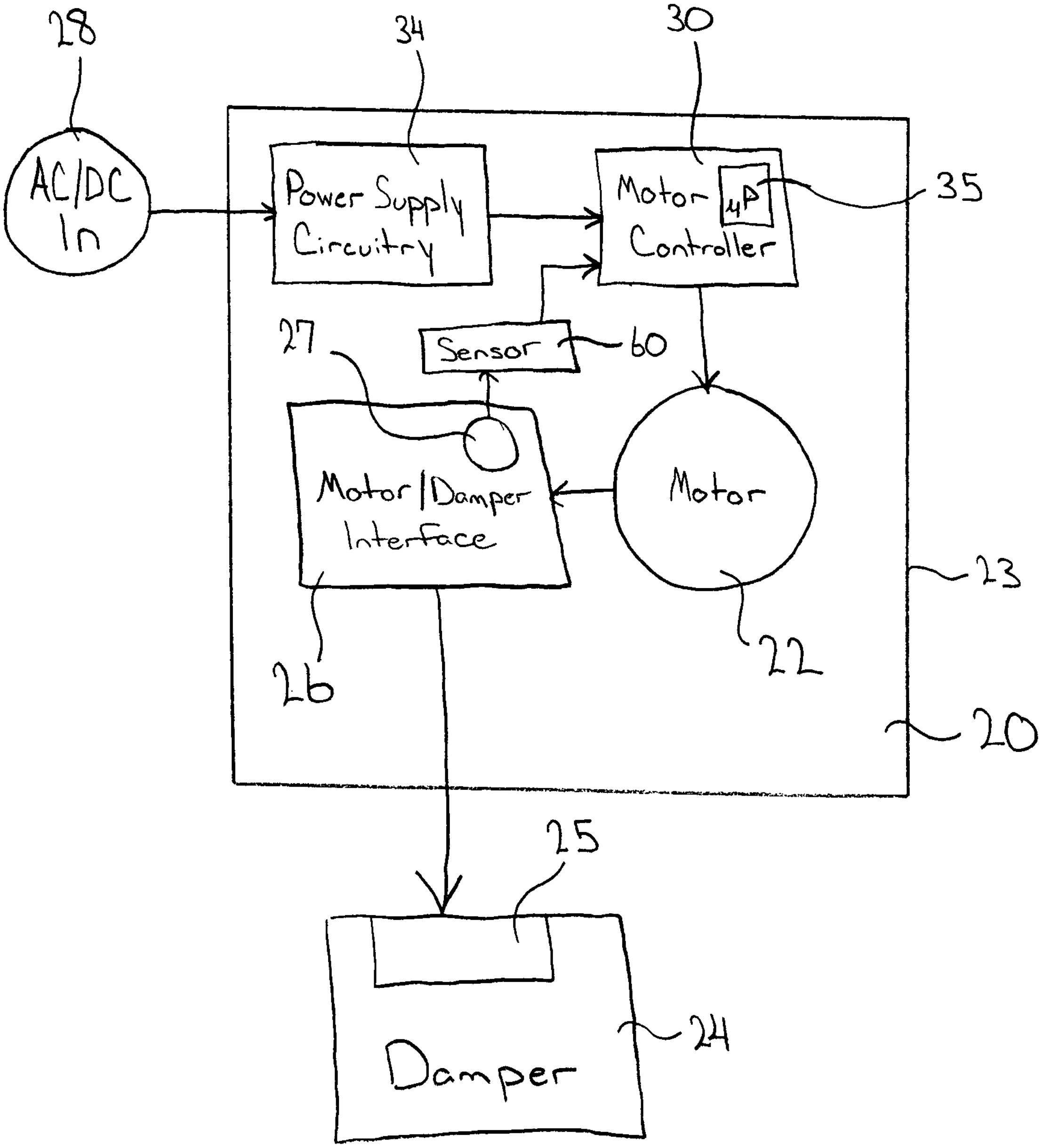
FIG. 3 shows a block diagram of a damper actuator assembly including a sensor configured to monitor the position of a follower gear.
Figure 4:
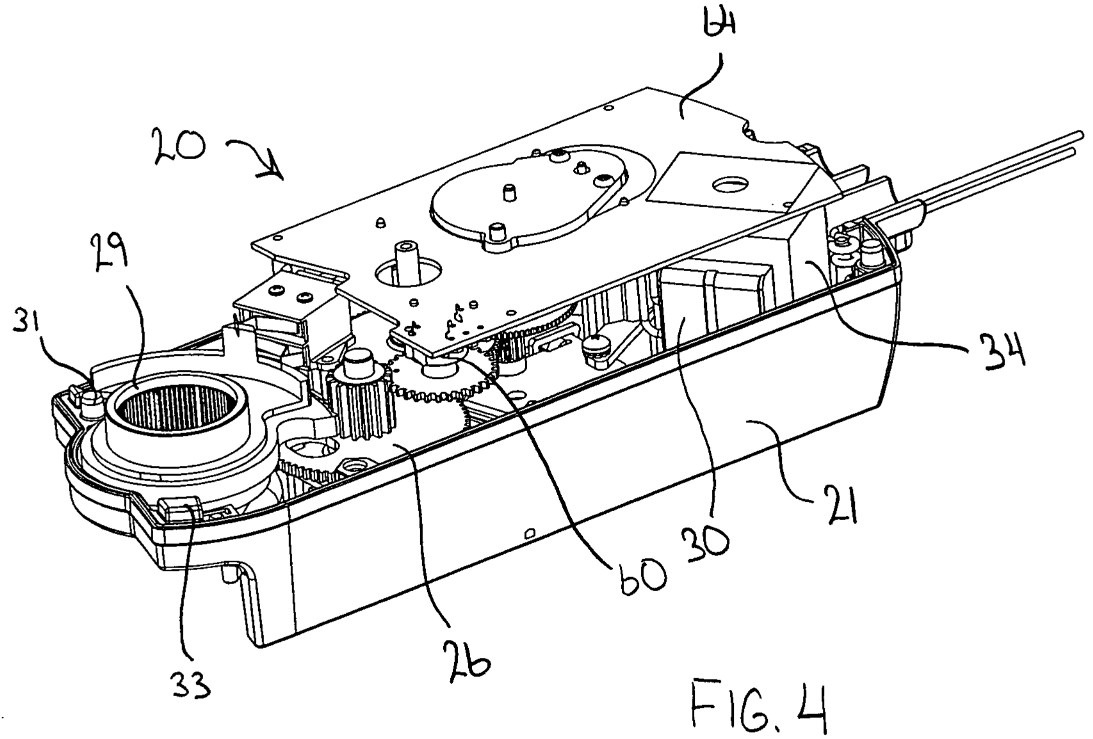
FIG. 4 shows a perspective view of an exemplary actuator of the damper actuator assembly of FIG. 3 with a portion of the housing removed from the actuator.
Figure 5:
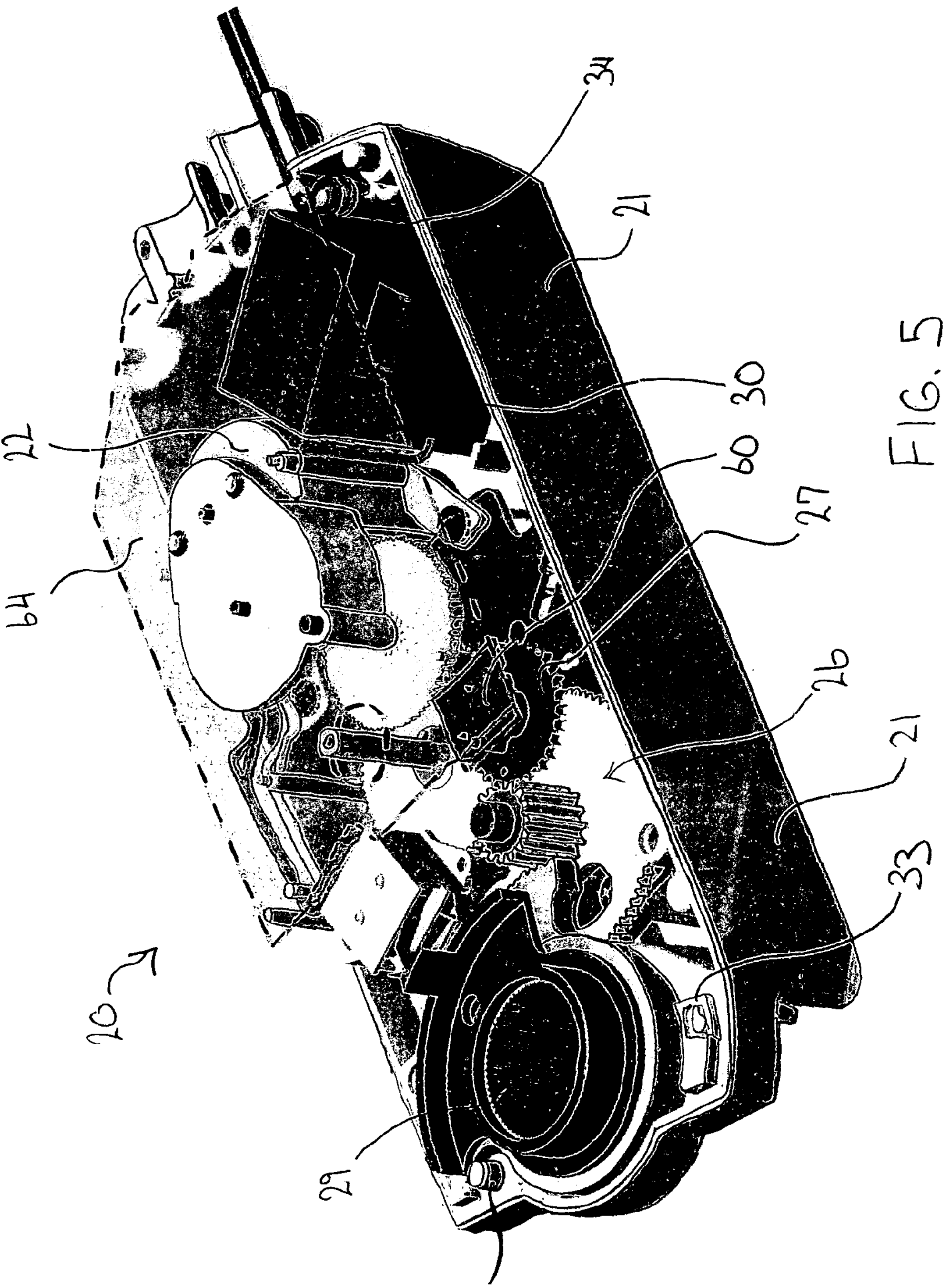
FIG. 5 shows the perspective view of FIG. 4 looking through a circuit board within the actuator.

The actuator 20 attached to the damper 24 is operable to control the damper 24 by rotating the louvers 32 of the damper 24. The actuator 20 is shown physically attached to the damper 24 in FIG. 2. A block diagram of the actuator 20 is shown in FIG. 3, while FIGS. 4 and 5 show the layout of various components of the actuator within an actuator housing 21. As shown in the figures, the actuator 20 generally includes power supply circuitry 34, a motor controller 30, a driving member in the form of a motor 22, and a motor/damper interface 26.

With particular reference to FIG. 3, a power source 28 is shown connected to the actuator 20. The power source 28 provides power to the power supply circuitry 34 of the actuator 20. The power supply circuitry 34 is configured to receive either AC or DC power (AC/DC IN) and provide appropriately conditioned AC or DC power to the motor controller 30 and motor 22. Thus, in one embodiment, the power supply circuitry 34 includes a circuit and transformer (not shown), if required, for converting AC power from a power source 28 into DC power for delivery to the DC motor 22 of the actuator. The power source 28 may suitably be the building electrical mains power source, or a special building power line carrying electricity specifically for HVAC building circuits and related emergency circuits.

As noted above, the power supply circuitry 34 within the actuator 20 receives power from the power source 28 and passes power on to the motor controller 30. The motor controller includes a processing device 35, such as microprocessor, and is configured to determine an appropriate power/motor control signal and deliver such a signal to the motor 22. The power signal delivered to the motor 22 from the motor controller 30 causes the motor to rotate. The power signal may be, for example, a pulse-width modulation (PWM) signal configured to control the motor with the appropriate torque output. In the disclosed embodiment, the processor 35 is included as part of the motor controller 30 and is provided within the same housing 21 with the motor 22 and the motor damper interface 26. However, one of skill in the art will recognize that the processor 35 could be provided outside of the actuator housing 21, such as at a remote computer.

Depending upon inputs received by the motor controller 30, the motor controller may operate the motor 22 in a forward or reverse direction. The motor/damper interface 26 translates motion from the motor 22 into motion that moves the damper control 25 and the associated louvers of the damper. Accordingly, the motor/damper interface comprises a gear train 26 operable to translate relatively fast rotation of the motor 22 into slower rotation of an actuator output gear 29 and the damper control shaft 40 connected to the output gear 29. The motor 22 will deliver a given torque output to the gear train 26 depending on the control signal delivered to the motor from the motor controller 30. The actual speed of motor rotation is dependent not only on the power delivered to the motor 22 from the motor controller 30, but also on the load on the gears 26. When the motor controller 30 provides more power, the motor 22 will deliver more torque, allowing the motor to drive the gear train at a faster speed. When the motor controller provides less power, the motor will provide less torque, causing the motor to drive the gear train at a slower speed. Accordingly, the motor controller is adapted to drive the motor and connected gear train at a plurality of different speeds. In one embodiment, the motor 22 is a brushless DC motor. However, those of skill in the art will recognize that other types of motors both AC and DC may be used, including synchronous motors, brushed DC motors, shaded pole motors and/or the like.

The actuator 20 is attached to the damper 24 such that the output 29 of the gear train 26 is connected to the damper control 25. In the exemplary embodiment of FIGS. 2 and 3, the output gear of the motor/damper interface 26 is connected to the control shaft 40 of the damper 24. Accordingly, the actuator 20 is configured such that rotation of the motor 22 drives the gear train 26 and the connected control shaft 40 of the damper 24. By driving the control shaft 40, the actuator 20 is operable to control the louvers 32 of the damper 24 between an open and a closed position. When the motor spins in one direction (e.g., a forward direction) the louvers open; when the motor spins in the opposite direction (e.g., a reverse direction) the louvers close. The degree of rotation of the gear train 26 and associated louvers 32 is limited by physical end stops 31, 33 (see FIGS. 4 and 5) between which the output gear 29 of the actuator is configured to rotate.

With specific reference again to FIG. 3, the actuator also includes a sensor 60. The sensor is configured to monitor the position of one of the gears of the gear train 26. In particular, the sensor 60 is configured to monitor the position of a follower gear 27, where the angular position of the follower gear is indicative of the angular position of the louvers 32 of the damper. For example, the follower gear 27 may rotate from 0° to 270° when the louvers 32 of the damper rotate from 0° to 90°. Accordingly, in this example, every three degrees of rotation of the follower gear 27 indicates one degree of rotation of the louvers 32. In this case, when the follower gear has rotated to an angular position of about 135° from its original position, the motor controller recognizes that the louvers are about half way (45°) between the open and closed position.

The sensor 60 is connected to the motor controller 30 and is configured to provide an electrical signal to the motor controller 30. The electrical signal from the sensor 60 is indicative of the angular position of the follower gear at a given time. The motor controller 30 accepts the signal from the sensor 60 along with other data inputs and interprets the data to determine the operation of the motor 22. Depending upon system 18 inputs, the motor controller 30 delivers a control signal to the motor 22 which causes the motor to operate in the forward direction or the reverse direction. When receiving power from the motor controller 30, the motor 22 will rotate at a given operational speed, depending on the amount of power provided to the motor. As explained in further detail herein, the motor controller 30 may increase or decrease the power to the motor through the control signal, and the change in power results in a change in the torque output and related operational speed of the motor. The motor controller 30 makes adjustments to the torque output of the motor 22 based at least in part on the input from the sensor 60, which input is indicative of the position of the damper louvers 32. Using the positional information obtained from the sensor 60 over a given time, the motor controller is also used to determine the angular speed of rotation of the damper louvers 32. Accordingly, the sensor device 60 and motor controller 30 are configured to provide closed loop control over the actuator 20.

Figure 6:
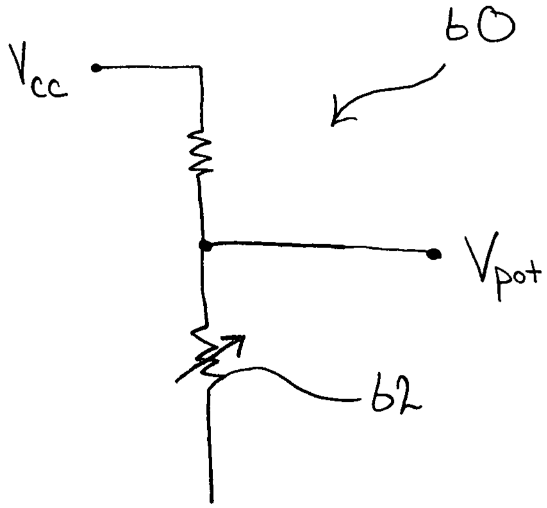
FIG. 6 shows a schematic diagram of the sensor of FIG. 3.

In the embodiment of FIGS. 4-6, the sensor 60 is provided using a potentiometer 62. The potentiometer 62 is mounted on a circuit board 64 within the actuator 20. The potentiometer 62 includes an adjustment mechanism that is connected to the follower gear 27. Rotation of the follower gear 27 moves the adjustment mechanism, changing the resistance provided across the potentiometer. The adjustment mechanism may be, for example, a knob connected to the axis of the follower gear 27. Rotation of the follower gear over a given angle results in rotation of the adjustment mechanism by the same angle, thus changing the resistance of the potentiometer 62.

As shown in the embodiment of FIG. 6, the electrical signal provided by the sensor 60 may be in the form of a voltage signal $V_{pot}$. As the resistance of the potentiometer 62 changes due to movement of the follower gear 27, the voltage signal $V_{pot}$ also changes. The motor controller 30 is configured to recognize $V_{pot}$ as indicative of the angular position of the follower gear 27 and the related louvers 32. Based at least in part on this signal, the motor controller determines the appropriate control signal to deliver to the motor 22. Although the sensor 60 of FIG. 6 is shown as including a potentiometer 62, one of skill in the art will recognize that the sensor 60 may take any of various forms with other components. For example, the sensor 60 may be provided in the form of an optical sensor, a Hall effect sensor, or any of numerous other sensors as are known in the art.

Figure 7:
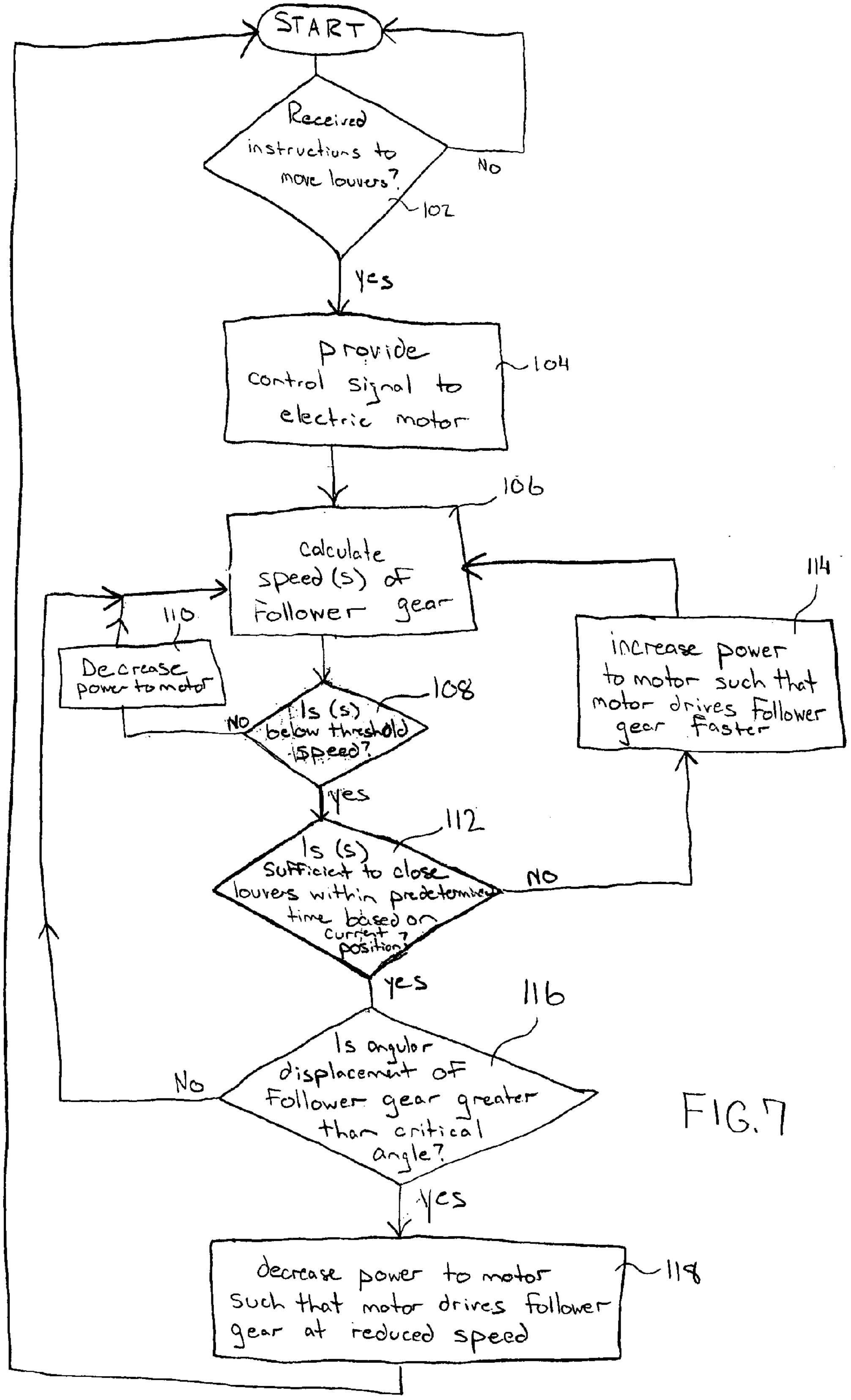
FIG. 7 shows a flow chart of a method of controlling the damper actuator assembly of FIG. 3.

With reference now to FIG. 7, a flow chart is shown showing the general steps taken by the motor controller 30 in order to determine the appropriate control signal to provide to the motor 22 such that the motor delivers a desired amount of torque to the gear train at a given time. First, in step 102, the motor remains in a steady state with the louvers 32 of the damper 24 being static. When the motor controller 30 receives an instruction to move the louvers 32, the method moves to step 104. In this step, the motor controller 30 determines an initial control signal for delivery to the motor. This initial control signal is a predetermined signal intended to fully open or close the louvers 32, per the received instruction, within a given amount of time and at a desired speed.

Next, the motor controller calculates the speed of the follower gear in step 106. To calculate the speed, the controller notes the position of the follower gear at a first time and then notes the position of the follower gear at a second time. The degree of rotation of the follower gear over the period of time between the first time and the second time provides the angular speed (s) of the follower gear. The speed of the follower gear is directly related to the speed of the louvers 32. In the example of FIG. 6, the speed of the follower gear is provided from the sensor 60 in terms of a change in resistance per second (or change in voltage per second across the potentiometer). This speed is correlated to a rotational speed of the follower gear and the corresponding rotational speed of the louvers. With this data provided, the motor controller is configured to control the motor as desired in order to open or close the louvers of the damper within a predetermined time.

With reference again to FIG. 7, after the speed (s) of the follower gear is determined, the motor controller 32 determines whether the motor is driving the gear train too fast in step 108. This determination is made to avoid excessive wear and tear on the gear train that might be associated with excessive speed. If the follower gear is rotating above a threshold speed, the torque output of the motor is decreased in step 110 to reduce the rotational speed of the follower gear and louvers. However, if the follower gear is rotating below a threshold speed in step 108, the motor controller moves to step 112 and determines whether the speed (s) of the follower gear is sufficient such that the louvers will open or close within the predetermined amount of time. For example, the louvers may need to completely open or close within a ten (10) to twenty (20) second timeframe from the initial instruction to open or close the louvers. In at least one typical embodiment, the louvers are required to go from open to closed (or vice-versa) in no more than fifteen (15) seconds. In order to insure that the louvers 32 will open or close within the given amount of time the motor controller 30 looks for the follower gear 27 to be moving at no less than a minimum speed. If the follower gear is not moving at this minimum speed, the motor controller changes the motor control signal in step 114 to increase the power provided to the motor, thus increasing the torque output of the motor and the speed at which the gear train and follower gear are driven.

After increasing power to the motor, the motor controller again determines the speed of the follower gear in step 106. This allows the motor controller to confirm that the speed of the follower gear is at least a minimum speed, but is no greater than a maximum speed. If the speed of the follower gear is appropriate, the motor controller moves on to step 116.

In step 116, the motor controller determines the total angular displacement of the follower gear. If the angular displacement of the follower gear has yet to reach a critical angle, the motor controller continues to monitor the speed of the follower gear and adjust the motor control signal accordingly by repeating steps 106-116. Advantageously, when repeating steps 106-116, the system is adapted to continue to monitor the progress of the damper louvers between the open and closed positions. Based on the known position and speed of the louvers at any given time, the motor controller may continually adjust the torque output from the motor, thus changing the speed of rotation of the actuator gear train, and ensuring that the louvers are opened within the allotted time. At the same time, the motor controller can minimize wear on the gear train by advantageously reducing the torque output from the motor at certain times.

As shown in step 116, if the angular displacement of the follower gear has reached the critical angle, the motor controller changes the motor control signal in step 118 to decrease power to the motor, thus reducing the operational speed of the motor. The critical angle is generally an angular displacement indicating that the gear train is approaching a mechanical end stop. For example, if the output gear 29 of the actuator is configured to rotate a total of 97° between mechanical end stops which define fully open and a fully closed positions, a critical angle of rotation may be defined as the angular displacement of the follower gear that indicates an angular displacement of 93° on the output gear. For example, 279° of angular displacement from the follower gear may indicate 93° of angular displacement from the output gear. In this example, after the output gear rotates a total of 93° in moving from the open to closed position (or vice-versa), the motor controller 30 changes the motor control signal to reduce the torque output from the motor, thus reducing the speed of rotation of the output gear. By reducing the speed of rotation of the output gear as it approaches the respective end stop, the impact and associated wear and tear on the gear train is reduced when the output gear contacts the end stops. In particular, instead of slamming against the end stops at a high speed, thus causing the gear train to slam to a high impact halt, the output gear is brought into contact with the end stop at a slow speed, allowing the gear train to come to more of a gentle stop with minimum impact on the gears. In the above example, the critical angle is defined as indicative of 93° of louver rotation, however, the critical angle may be defined as numerous other angles. In most embodiments, the critical angle will be indicative of at least 80° of louver rotation.

Although the present invention has been described with respect to certain preferred embodiments, it will be appreciated by those of skill in the art that other implementations and adaptations are possible. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A damper actuator assembly including a processor and connected to a damper, the damper actuator assembly comprising:

a) a gear train including a follower gear, the follower gear rotating less than a complete revolution for an entire range of travel of the damper;

b) a sensor, wherein the sensor is a potentiometer, configured to monitor the position of the follower gear and configured to provide an electrical signal indicative of the angular position of the follower gear to the processor; c) the processor is configured to determine an angular speed corresponding to an angular speed of the follower gear based on the electric signal provided by the sensor at different times and configured to control a driving member at two or more non-zero speeds; d) wherein the processor is configured to control the driving member connected to the gear train and configured to drive the gear train at two or more different non-zero speeds depending on the electrical signal indicative of the angular position of the follower gear; and e) wherein the driving member controls the rotational speed of the follower gear such that the follower gear rotates to an open and closed position within a predetermined time.

2. The damper actuator of claim 1 wherein the processor is configured to determine the angular position of the follower gear based upon the electrical signal delivered to the processor.

3. The damper actuator of claim 1 wherein the processor is configured to cause the driving member to receive different amounts of power depending upon the electrical signal provided by the sensor.

4. The damper actuator of claim 3 wherein the processor is configured to cause the driving member to receive more power if the electrical signal indicates that the follower gear is rotating slower than a predetermined speed.

5. The damper actuator of claim 3 wherein the processor is configured to cause the driving member to receive less power if the electrical signal indicates that the follower gear is rotating faster than a predetermined speed.

6. The damper actuator of claim 1 wherein the driving member comprises an electric motor.

7. The damper actuator of claim 1 wherein the processor is retained within an actuator housing along with the driving member, the gear train, and the sensor.

8. A method of controlling an electric motor in a damper actuator connected to a damper, the method comprising:

a) rotating a follower gear, within a gear train of the damper actuator less than a complete revolution for an entire range of travel of the damper; b) monitoring the position of a follower gear using a sensor, wherein the sensor is a potentiometer coupled to the follower gear and configured to provide an electrical signal indicative of the angular position of the follower gear to a processor; c) determining an angular speed with the processor, corresponding to an angular speed of the follower gear based on the electric signal provided by the sensor at different times; and d) controlling the speed of rotation of the follower gear with the processor based upon the position of the follower gear such that the follower gear rotates at a first non-zero speed when the follower gear is in a first position and the follower gear rotates at a second non-zero speed when the follower gear is in a second position and such that the follower gear rotates to an open and closed position within a predetermined time.

9. The method of claim 8 wherein the step of controlling the speed of rotation of the follower gear includes increasing or decreasing the amount of power provided to an electric motor configured to drive the gear drain depending on the determined speed of the follower gear.

10. The method of claim 8 wherein the step of controlling the speed of the follower gear includes decreasing the power to an electric motor configured to drive the gear train when the follower gear arrives at a predetermined angular position of at least 80°.

11. The damper actuator assembly of claim 8 wherein the step of monitoring the position of the follower gear includes providing an electrical signal from a potentiometer indicative of the position of the follower gear.

12. A damper actuator assembly configured to control at least one blocking member of a damper, the assembly comprising:

a) a gear train including a follower gear operably coupled between a motor output and a damper control member;

b) an electric motor configured to drive the gear train at a plurality of operational speeds including a first non-zero speed and a second non-zero speed; c) a sensor, wherein the sensor is a potentiometer, operably coupled to the follower gear and configured to monitor the position of the follower gear and to provide an electrical signal indicative of the angular position of the follower gear to a processor; d) the processor is configured to determine an angular speed corresponding to an angular speed of the follower gear based on the electric signal provided by the sensor at different times; and e) a controller configured to receive the electrical signal indicative from the processor of the position of the follower gear from the sensor and provide a motor control signal, the motor control signal configured to change the operational speed of the electric motor from the first non-zero speed to the second non-zero speed based on the position of the follower gear such that the follower gear rotates to an open and closed position within a predetermined time.

13. The damper actuator of claim 12, wherein the follower gear rotates less than a complete revolution for an entire range of travel of the damper control member.

14. The damper actuator of claim 13, wherein the follower gear rotates an angular speed that exceeds an angular speed of the damper control member.

15. The damper actuator of claim 12, wherein the follower gear rotates less than a complete revolution for an entire range of travel of the damper control member.

16. The damper actuator of claim 15, wherein the follower gear rotates an angular speed that exceeds an angular speed of the damper control member.

17. The damper actuator of claim 16, wherein the controller is further configured to determine an angular speed of the follower gear based on the electric signal provided by the sensor at two different times.

* * * * *